(12) United States Patent
Takeda et al.

(10) Patent No.: US 7,715,071 B2
(45) Date of Patent: May 11, 2010

(54) APPARATUS FOR MEASURING COLOR VALUES OF PRINTS

(75) Inventors: Kazuya Takeda, Kyoto (JP); Kazuki Fukui, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 1371 days.

(21) Appl. No.: 11/147,351

(22) Filed: Jun. 8, 2005

(65) Prior Publication Data

US 2006/0007454 A1    Jan. 12, 2006

(30) Foreign Application Priority Data

Jun. 25, 2004    (JP)    ............................ 2004-188240

(51) Int. Cl.
G03F 3/00    (2006.01)
H04N 1/04    (2006.01)
H04N 1/047    (2006.01)
H04N 17/06    (2006.01)

(52) U.S. Cl. .................. 358/518; 358/1.5; 358/1.9; 358/461; 358/498; 358/504; 358/505; 358/509; 358/514; 358/523; 358/406; 358/474; 358/475; 382/167; 382/274; 399/207; 399/208; 347/19; 347/153

(58) Field of Classification Search .............. 358/1.5, 358/461, 498, 504, 505, 509, 514, 518, 523, 358/406, 474, 475, 1.9; 382/167, 274; 399/207, 399/208; 347/19, 153
See application file for complete search history.

(56) References Cited

U.S. PATENT DOCUMENTS

| 4,926,251 | A | * | 5/1990 | Sekizawa et al. ............. 358/535 |
| 5,030,838 | A |   | 7/1991 | Inde et al. |
| 5,276,459 | A | * | 1/1994 | Danzuka et al. ........... 346/33 A |
| 5,970,181 | A | * | 10/1999 | Ohtsu .......................... 382/274 |
| 6,018,355 | A | * | 1/2000 | Kuwabara .................... 347/188 |
| 6,050,192 | A | * | 4/2000 | Kipphan et al. ............. 101/232 |
| 6,081,608 | A |   | 6/2000 | Fujii et al. |
| 6,119,594 | A | * | 9/2000 | Kipphan et al. ............. 101/365 |
| 6,222,301 | B1 | * | 4/2001 | Sakai ..................... 310/316.01 |
| 6,359,706 | B1 | * | 3/2002 | Arita et al. ................... 358/486 |
| 6,408,156 | B1 | * | 6/2002 | Miyazaki et al. ............ 399/301 |

(Continued)

FOREIGN PATENT DOCUMENTS

EP    0 668 162    8/1995

(Continued)

OTHER PUBLICATIONS

Japanese Office Action issued in Japanese Patent Application No. JP 2004-188240 dated on Feb. 10, 2009, No Translation.

*Primary Examiner*—David K Moore
*Assistant Examiner*—Beniyam Menberu
(74) *Attorney, Agent, or Firm*—McDermott Will & Emery LLP

(57) ABSTRACT

A white reference value and a corresponding transport speed are stored in memory. A black reference value and a corresponding imaging speed are also stored. Next, a printing operation is started and color values and a corresponding transport speed are stored. Accurately corrected color values are derived from the stored white reference value, transport speed, black reference value, imaging speed, color values and transport speed.

14 Claims, 5 Drawing Sheets

U.S. PATENT DOCUMENTS

| | | | |
|---|---|---|---|
| 6,710,792 B1 * | 3/2004 | Ito et al. | 347/233 |
| 6,715,417 B2 * | 4/2004 | Okuda | 101/181 |
| 7,236,270 B2 * | 6/2007 | Okamura | 358/406 |
| 2002/0075488 A1 * | 6/2002 | Ito | 358/1.3 |
| 2003/0007196 A1 * | 1/2003 | Ishimaru et al. | 358/486 |
| 2003/0007816 A1 * | 1/2003 | Ishimaru et al. | 399/367 |
| 2004/0189783 A1 * | 9/2004 | Mogi | 347/218 |

FOREIGN PATENT DOCUMENTS

| | | |
|---|---|---|
| EP | 1 232 859 | 8/2002 |
| EP | 1 462 249 | 9/2004 |
| EP | 1 527 875 | 5/2005 |
| EP | 1 566 270 | 8/2005 |
| JP | 60-145852 | 8/1985 |
| JP | 60-217153 | 10/1985 |
| JP | 61-219648 | 9/1986 |
| JP | 2-185443 | 7/1990 |
| JP | 2-57772 | 12/1990 |
| JP | 08-098023 | 4/1996 |
| JP | 8-216379 | 8/1996 |

* cited by examiner

APPARATUS FOR MEASURING COLOR VALUES OF PRINTS

BACKGROUND OF THE INVENTION

1. Field of the Invention

This invention relates to an apparatus for measuring color values of prints for performing a shading correction of image data obtained by imaging reference plates with an imaging device, and to a shading correcting method.

2. Description of the Related Art

A known such apparatus is disclosed in Japanese Unexamined Patent Publication No. 8-98023. This apparatus includes an imaging device for imaging objects, and a sensitivity adjusting device for adjusting sensitivity of the imaging device based on reference values obtained by imaging a white reference plate and a black reference plate. The apparatus can thereby obtain proper color values from the objects.

In order to reduce spoilage, an actual printing operation may be carried out such that printing is performed at low speed after starting the printing until the printing stabilizes, and at high speed after the printing attains stability. Further, printing speed may be adjusted as appropriate according to the thickness of printing paper and the like. When, with the printing speed varied as above, densities or colorimetric values (hereinafter collectively called "color values") of prints are measured while the prints are transported, a device is used for varying intervals for imaging the prints (hereinafter called sampling intervals) in order to equalize resolution. As a result, when print transport speed is changed, the amount of color value data obtained by imaging the prints at predetermined sampling intervals varies even if the prints are identical. Therefore, the apparatus described in Japanese Unexamined Patent Publication No. 8-98023 cannot obtain proper color values of the prints, despite the sensitivity adjustment, when reference paper and the prints are transported at different speeds.

On the other hand, Japanese Patent Publication No. 2-57772 discloses a technique for correcting color values to proper values by multiplying actually detected color values by a ratio between a transport speed in time of reference measurement of prints and a transport speed in time of inspection.

However, the color value and transport speed are not necessarily in exact proportionality. It is therefore impossible to correct color values to proper values only by multiplying actually detected color values by a ratio between a transport speed in time of reference measurement of prints and a transport speed in time of inspection.

SUMMARY OF THE INVENTION

The object of this invention, therefore, is to provide an apparatus for measuring color values of prints and a shading correcting method, capable of correcting the color values of the prints accurately even when print transport speed changes.

The above object is fulfilled, according to this invention, by an apparatus for measuring color values of prints, having an imaging device with a plurality of imaging elements arranged transversely of a print transport direction for imaging, at predetermined intervals, the prints transported by a transport device, the apparatus performing a shading correction of image data from the plurality of imaging elements by using reference values obtained by imaging reference plates with the imaging device, the apparatus comprising a control device for variably controlling a print transport speed of the transport device; a storage device for storing a relationship between the print transport speed and reference values corresponding to the print transport speed; and a correcting device for correcting color values obtained by imaging the prints with the imaging device, by using reference values corresponding to an actual print transport speed obtained from a print transport speed in time of actual printing and the relationship, stored in the storage device, between the print transport speed and the reference values corresponding to the print transport speed.

With the shading correction noted above, the color values of prints may be corrected accurately even when a print transport speed changes.

In a preferred embodiment, the relationship, stored in the storage device, between the print transport speed and the reference values corresponding to the print transport speed is determined by using preliminary reference values obtained by imaging the reference plates transported at a plurality of different speeds as a preliminary step.

In another preferred embodiment, the reference values are a white reference value obtained by imaging a white reference plate, and a black reference value obtained by imaging a black reference plate.

In a different aspect of the invention, a shading correcting method for performing a shading correction of image data from the plurality of imaging elements by using reference values obtained by imaging reference plates with the imaging device, the method comprising a reference plate imaging step for imaging the reference plates with the imaging device; a storing step for storing a relationship between the print transport speed and reference values corresponding to the print transport speed; a print imaging step for imaging, with the imaging device, the prints transported by the transport device; and a correcting step for correcting color values obtained by imaging the prints with the imaging device, by using reference values corresponding to an actual print transport speed obtained from a print transport speed in time of an actual printing operation and the relationship, stored in the storing step, between the print transport speed and the reference values corresponding to the print transport speed.

Other features and advantages of the invention will be apparent from the following detailed description of the embodiments of the invention.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Figure 1:
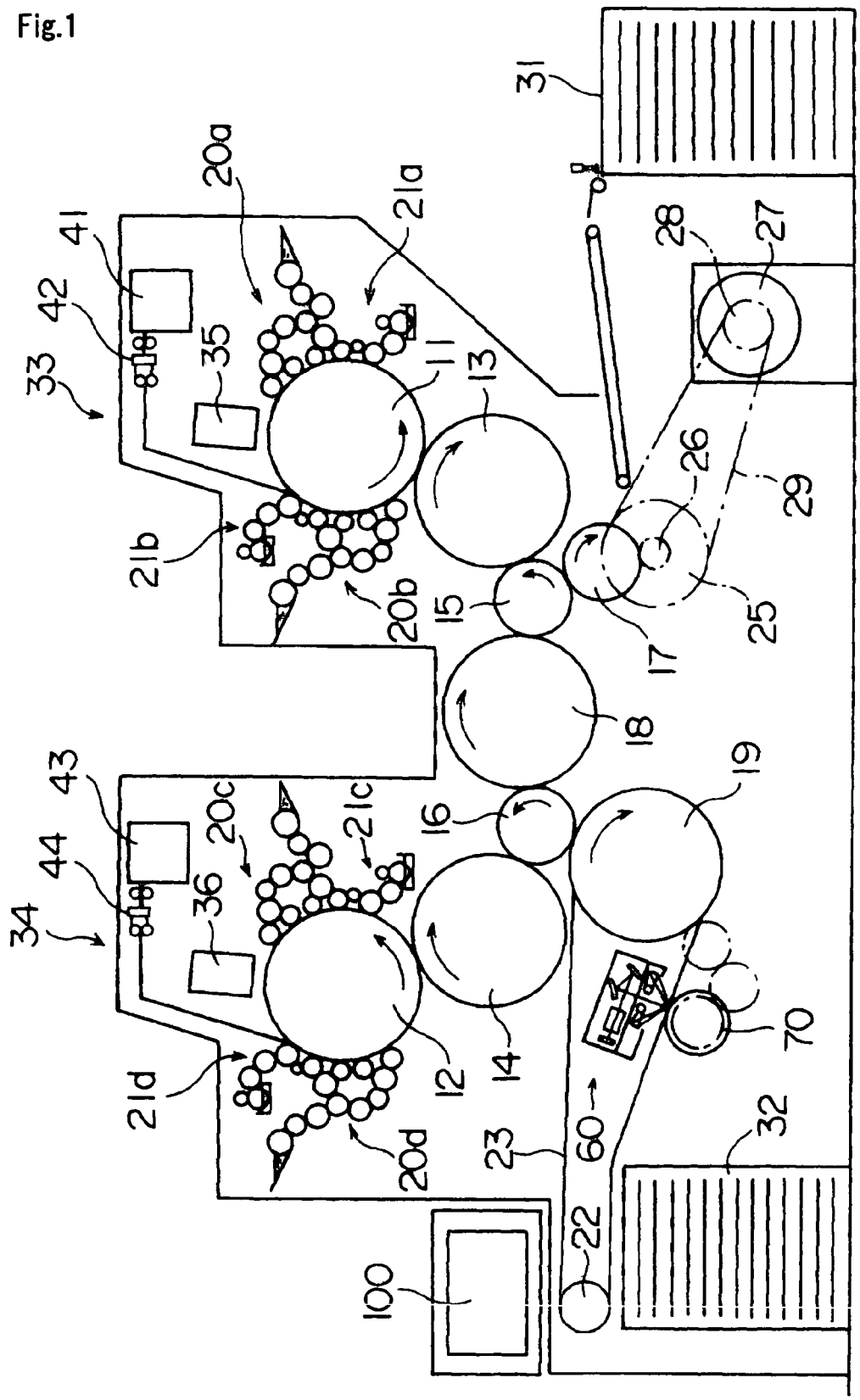
FIG. 1 is a schematic view of a printing machine according to this invention.

An embodiment of this invention will be described hereinafter with reference to the drawings. The construction of a printing machine according to this invention will be described first. FIG. 1 is a schematic view of the printing machine according to this invention.

This printing machine records images on blank plates mounted on first and second plate cylinders 11 and 12 in a prepress process, feeds inks to the plates having the images recorded thereon, and transfers the inks from the plates through first and second blanket cylinders 13 and 14 to printing paper held on first and second impression cylinders 15 and 16, thereby printing the images in four colors on the printing paper.

The printing machine has the first plate cylinder 11, the second plate cylinder 12, the first blanket cylinder 13 contactable with the first plate cylinder 11, the second blanket cylinder 14 contactable with the second plate cylinder 12, the first impression cylinder 15 contactable with the first blanket cylinder 13, and the second impression cylinder 16 contactable with the second blanket cylinder 14. The printing machine further includes a feed cylinder 17 for transferring printing paper supplied from a paper storage station 31 to the first impression cylinder 15, a transfer cylinder 18 for transferring the printing paper from the first impression cylinder 15 to the second impression cylinder 16, a discharge cylinder 19 with chains 23 wound thereon and extending to and wound on sprockets 22 for discharging prints from the second impression cylinder 16 to a discharge station 32, a device for measuring color values of prints which includes an image pickup station 60 for reading images from the prints and measuring densities of detecting patches printed on the prints, and a control panel 100 of the touch panel type.

Each of the first and second plate cylinders 11 and 12 is what is called a two-segmented cylinder for holding two printing plates peripherally thereof for printing in two different colors. The first and second blanket cylinders 13 and 14 have the same diameter as the first and second plate cylinders 11 and 12, and each has blanket surfaces for transferring images in two colors.

The first and second impression cylinders 15 and 16 movable into contact with the first and second blanket cylinders 13 and 14, respectively, have half the diameter of the first and second plate cylinders 11 and 12 and the first and second blanket cylinders 13 and 14. The first and second impression cylinders 15 and 16 have grippers, not shown, for holding and transporting the forward end of printing paper.

The feed cylinder 17 disposed adjacent the first impression cylinder 15 has the same diameter as the first and second impression cylinders 15 and 16. The feed cylinder 17 has a gripper, not shown, for holding and transporting, with each intermittent rotation of the feed cylinder 17, the forward end of each sheet of printing paper fed from the paper storage station 31. When the printing paper is transferred from the feed cylinder 17 to the first impression cylinder 15, the gripper of the first impression cylinder 15 holds the forward end of the printing paper which has been held by the gripper of the feed cylinder 17.

The transfer cylinder 18 disposed between the first impression cylinder 15 and second impression cylinder 16 has the same diameter as the first and second plate cylinders 11 and 12 and the first and second blanket cylinders 13 and 14. The transfer cylinder 18 has a gripper, not shown, for holding and transporting the forward end of the printing paper received from the first impression cylinder 15, and transferring the forward end of the printing paper to the gripper of the second impression cylinder 16.

Figure 2:
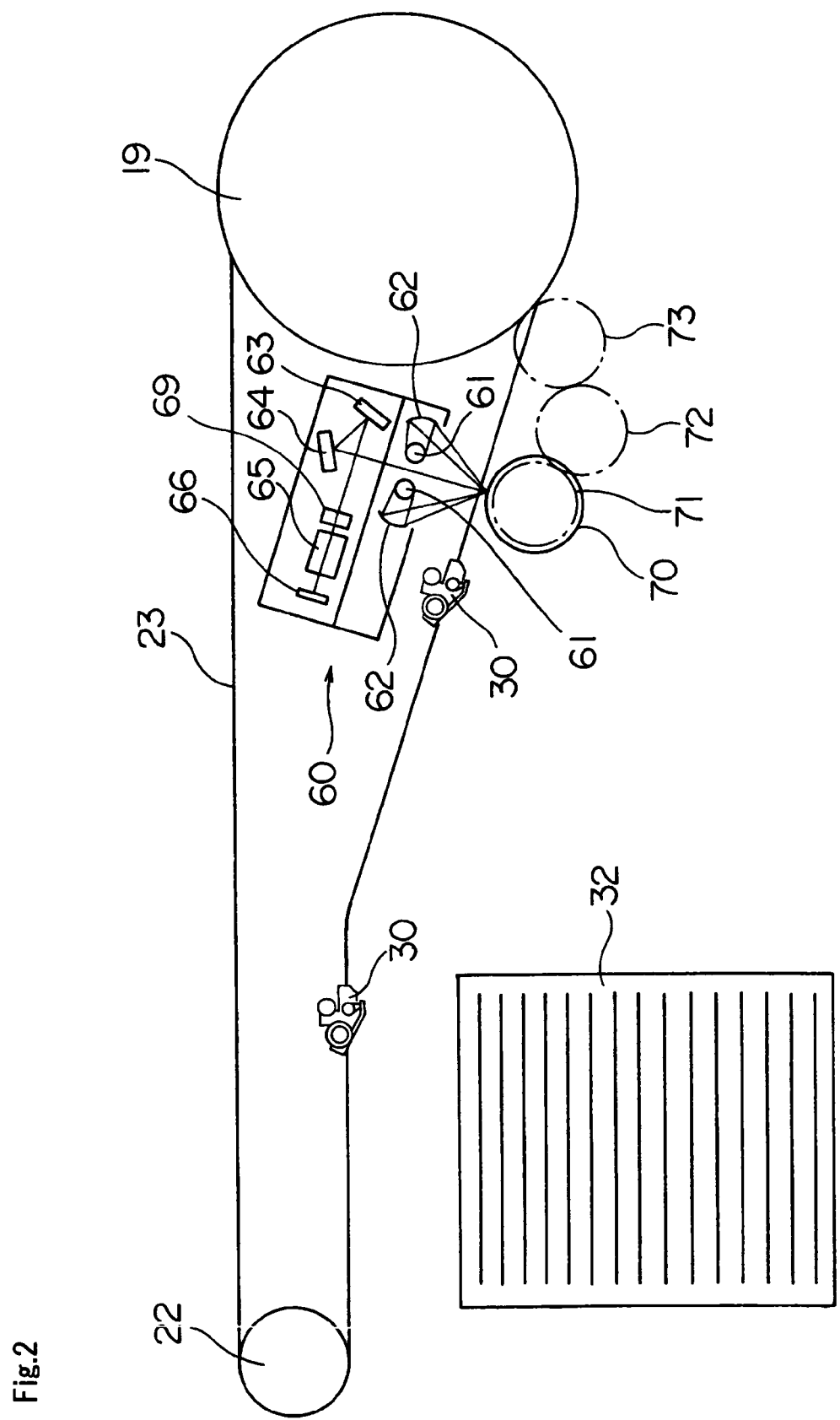
FIG. 2 is a schematic view showing, along with a print discharge cylinder, an image pickup station for reading images from prints.

The discharge cylinder 19 disposed adjacent the second impression cylinder 16 has the same diameter as the first and second plate cylinders 11 and 12 and the first and second blanket cylinders 13 and 14. The discharge cylinder 19 has a pair of chains 23 wound around opposite ends thereof. The chains 23 are interconnected by coupling members, not shown, having a plurality of grippers 30 (FIG. 2). When the second impression cylinder 16 transfers prints to the discharge cylinder 19, one of the grippers 30 on the discharge cylinder 17 holds the forward end of the prints having been held by the gripper of the second impression cylinder 16. With movement of the chains 23, the prints are transported to the discharge station 32 to be discharged thereon.

The feed cylinder 17 has a gear attached to an end thereof and connected to a gear 26 disposed coaxially with a driven pulley 25. A belt 29 is wound around and extends between the driven pulley 25 and a drive pulley 28 rotatable by a motor 27. Thus, the feed cylinder 17 is rotatable by drive of the motor 27. The first and second plate cylinders 11 and 12, first and second blanket cylinders 13 and 14, first and second impression cylinders 15 and 16, feed cylinder 17, transfer cylinder 18 and discharge cylinder 19 are coupled to one another by gears attached to ends thereof, respectively. Thus, by the drive of motor 27, the feed cylinder 17, first and second impression cylinders 15 and 16, discharge cylinder 19, first and second blanket cylinders 13 and 14, first and second plate cylinders 11 and 12 and transfer cylinder 18 are rotatable synchronously with one another. The rotating speeds of these cylinders are variable under control of a control unit 80 described hereinafter.

The first plate cylinder 11 is surrounded by an ink feeder 20a for feeding an ink of black (K), for example, to a plate, an ink feeder 20b for feeding an ink of cyan (C), for example, to a plate, and dampening water feeders 21a and 21b for feeding dampening water to the plates. The second plate cylinder 12 is surrounded by an ink feeder 20c for feeding an ink of magenta (M), for example, to a plate, an ink feeder 20d for feeding an ink of yellow (Y), for example, to a plate, and dampening water feeders 21c and 21d for feeding dampening water to the plates.

Further, arranged around the first and second plate cylinders 11 and 12 are a plate feeder 33 for feeding plates to the peripheral surface of the first plate cylinder 11, a plate feeder 34 for feeding plates to the peripheral surface of the second plate cylinder 12, an image recorder 35 for recording images on the plates mounted peripherally of the first plate cylinder 1, and an image recorder 36 for recording images on the plates mounted peripherally of the second plate cylinder 12.

FIG. 2 is a schematic side view showing the image pickup station 60 for reading images from the prints, along with the discharge cylinder 19.

The pair of chains 23 are endlessly wound around the opposite ends of the discharge cylinder 19 and the pair of sprockets 22. The chains 23 are interconnected by coupling members, not shown, having a plurality of grippers 30 arranged thereon each for gripping the forward end of prints transported. FIG. 2 shows only two grippers 30, with the other grippers 30 omitted.

The pair of chains 23 have a length corresponding to a multiple of the circumference of first and second impression cylinders 15 and 16. The grippers 30 are arranged on the chains 23 at intervals each corresponding to the circumference of first and second impression cylinders 15 and 16. Each gripper 30 is opened and closed by a cam mechanism, not shown, synchronously with the gripper on the discharge cylinder 19. Thus, each gripper 30 receives the prints from the discharge cylinder 19, transports the prints with rotation of the chains 23, and is then opened by the cam mechanism, not shown, to discharge the prints on the discharge station 32.

Each print is transported with only the forward end thereof held by one of the grippers 30, the rear end of print not being fixed. Consequently, the print could flap during transport, which impairs operations, to be described hereinafter, of the image pickup station 60 to read images and measure densities of the detecting patches. To avoid such an inconvenience, this printing machine provides a suction roller 70 disposed upstream of the discharge station 32 for stabilizing the prints transported.

The suction roller 70 is in the form of a hollow roller having a surface defining minute suction bores, with the hollow interior thereof connected to a vacuum pump not shown. The suction roller 70 has a gear 71 attached to an end thereof. The gear 71 is connected through idler gears 72 and 73 to the gear attached to an end of the discharge cylinder 19. Consequently, the suction roller 43 is driven to rotate in a matching relationship with a moving speed of the grippers 30. Thus, the prints are sucked to the surface of the suction roller 70, thereby being held against flapping when passing over the suction roller 70. In place of the suction roller 70, a suction plate may be used to suck the prints two-dimensionally.

The device for measuring color values of the prints includes the image pickup station 60, and a print transport device having the discharge cylinder 19 and chains 23 noted above. The image pickup station 60 includes a pair of linear light sources 61 extending parallel to the suction roller 70 for illuminating the prints on the suction roller 70, a pair of condensing plates 62, reflecting mirrors 63 and 64, a condenser lens 65, a CCD line sensor 66, and a shutter 69 acting as a shield for stopping light traveling to the condenser lens 65. The prints transported by the print discharge mechanism including the discharge cylinder 19 and chains 23 are illuminated by the pair of linear light sources 61, and photographed by the CCD line sensor 66. The images of the prints and density data derived from image data are displayed on the control panel 100 of the touch panel type.

The CCD line sensor 66 has a plurality of CCDs arranged transversely of the print transport direction. The sensor 66 detects light from a print in each sampling interval L in the print transport direction and stores a resulting amount of electric charges in a RAM 82. At the same time, the electric charges accumulated in one sampling interval L are initialized to detect light from the print and accumulate electric charges in a next sampling interval L.

Figure 3:
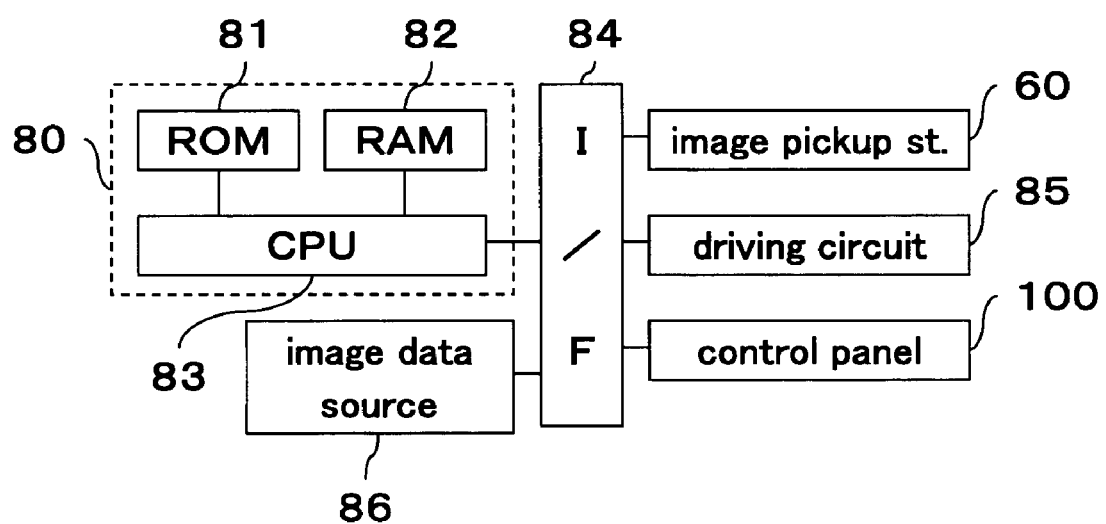
FIG. 3 is a block diagram showing a principal electrical structure of the printing machine.

FIG. 3 is a block diagram showing a principal electrical structure of the printing machine. The machine includes the control unit 80 having a ROM 81 for storing operating programs necessary for controlling the machine, a RAM 82 for temporarily storing data and the like during a control operation, and a CPU 83 for performing logic operations. The control unit 80 has a driving circuit 85 connected thereto through an interface 84, for generating driving signals for driving the ink feeders 20, dampening water feeders 21, and image recorders 35 and 36. The control unit 80 has also a driving circuit 85 connected thereto through the interface 84, for generating driving signals for the motor 27 for controlling the rotating speeds of the first and second plate cylinders 11 and 12, first and second blanket cylinders 13 and 14, first and second impression cylinders 15 and 16, feed cylinder 17, transfer cylinder 18 and discharge cylinder 19. The control unit 80 is connected through the interface 84 to the image pickup station 60, touch panel type control panel 100 and an image data source 86 storing control images for use in platemaking and printing. Further, the control unit 80 is electrically connected to the shutter 69 for opening and closing of the shutter 69. The printing machine is controlled by this control unit 80 to perform a shading correcting process described hereinafter.

In the printing machine having the above construction, a printing plate stock drawn from a supply cassette 41 of the plate feeder 33 is cut to a predetermined size by a cutter 42. The forward end of each plate in cut sheet form is guided by guide rollers and guide members, not shown, and is clamped by clamps of the first plate cylinder 11. Then, the plate is wrapped around the peripheral surface of the first plate cylinder 11, and the rear end of the plate is clamped by other clamps of the first plate cylinder 11. While, in this state, the first plate cylinder 11 is rotated at low speed, the image recorder 35 irradiates the surface of the plate mounted peripherally of the first plate cylinder 11 with a modulated laser beam for recording an image thereon.

Similarly, a printing plate stock drawn from a supply cassette 43 of the plate feeder 34 is cut to the predetermined size by a cutter 44. The forward end of each plate in cut sheet form is guided by guide rollers and guide members, not shown, and is clamped by clamps of the second plate cylinder 12. Then, the second plate cylinder 12 is driven by a motor, not shown, to rotate at low speed, whereby the plate is wrapped around the peripheral surface of the second plate cylinder 12. The rear end of the plate is clamped by other clamps of the second plate cylinder 12. While in this state, the second plate cylinder 12 is rotated at low speed, the image recorder 36 irradiates the surface of the plate mounted peripherally of the second plate cylinder 12 with a modulated laser beam for recording an image thereon.

The first plate cylinder 11 has, mounted peripherally thereof, a plate for printing in black ink and a plate for printing in cyan ink. The two plates are arranged in evenly separated positions (i.e. in positions separated from each other by 180 degrees). The image recorder 35 records images on these plates. Similarly, the second plate cylinder 12 has, mounted peripherally thereof, a plate for printing in magenta ink and a plate for printing in yellow ink. The two plates also are arranged in evenly separated positions, and the image recorder 36 records images on these plates, to complete a prepress process.

The prepress process is followed by a printing process for printing the printing paper with the plates mounted on the first and second plate cylinders 11 and 12. This printing process is carried out as follows.

First, each dampening water feeder 21 and each ink feeder 20 are placed in contact with only a corresponding one of the plates mounted on the first and second plate cylinders 11 and 12. Consequently, dampening water and inks are fed to the plates from the corresponding water feeders 21 and ink feeders 20, respectively. These inks are transferred from the plates to the corresponding regions of the first and second blanket cylinders 13 and 14, respectively.

Then, the printing paper is fed to the feed cylinder 17. The printing paper is subsequently passed from the feed cylinder 17 to the first impression cylinder 15. The impression cylinder 15 having received the printing paper continues to rotate. Since the first impression cylinder 15 has half the diameter of the first plate cylinder 11 and the first blanket cylinder 13, the black ink is transferred to the printing paper wrapped around the first impression cylinder 15 in its first rotation, and the cyan ink in its second rotation.

After the first impression cylinder 15 makes two rotations, the printing paper is passed from the first impression cylinder 15 to the second impression cylinder 16 through the transfer cylinder 18. The second impression cylinder 16 having received the printing paper continues to rotate. Since the second impression cylinder 16 has half the diameter of the second plate cylinder 12 and the second blanket cylinder 14, the magenta ink is transferred to the printing paper wrapped around the second impression cylinder 16 in its first rotation, and the yellow ink in its second rotation.

The forward end of the print printed in the four colors in this way is passed from the second impression cylinder 16 to the discharge cylinder 19. The print is transported by the pair of chains 23 toward the discharge station 32 to be discharged thereon. At this time, the print being transported is illuminated by the pair of linear light sources 61, and is photographed by the CCD line sensor 66. The photographed image is displayed on the control panel 100.

This printing machine has a reference reading mode for imaging blank paper as white reference plate and imaging the shutter 69 as black reference plate.

In time of white reference imaging in the reference reading mode, the first and second blanket cylinders 13 and 14 are placed in throw-off state separated from the first and second plate cylinders 11 and 12 and the first and second impression cylinders 15 and 16. Blank paper is fed from the paper storage station 31. The blank paper is passed to the discharge cylinder 19 as are the prints described hereinbefore. Then, the blank paper is transported by the chains 23 toward the discharge station 28. At this time, the blank paper transported is illuminated by the pair of linear light sources 61 in the image pickup station 60, and is imaged by the CCD line sensor 66.

In time of black reference imaging in the reference reading mode, the shutter 69 is set to a shielding position for shielding the front of the condenser lens 65. This stops light traveling to the condenser lens 65, and the CCD line sensor 66 detects hardly any light as when imaging black paper. In this state, the CCD line sensor 66 images the shutter 69 at every accumulating time t needed for imaging blank paper in every sampling interval L.

The shading correcting method according to this invention will be described hereinafter.

In a conventional shading correcting method, color values Pa of prints are corrected by using white reference value Wa obtained by imaging a white reference plate and black reference value Ba obtained by imaging a black reference plate. The shading correcting method according to this invention measures white preliminary reference values Wc and black preliminary reference values Bc obtained by imaging the white reference plate and black reference plate at a plurality of different transport speeds as a preliminary step, and determines a relationship (equations (1) and (2) described hereinafter) between print transport speed Vp, and white reference value Wb and black reference value Bb corresponding to the print transport speed Vp. Then, color values Pa of prints are corrected by using values obtained by correcting white reference value Wa and black reference value Ba.

Figure 4:
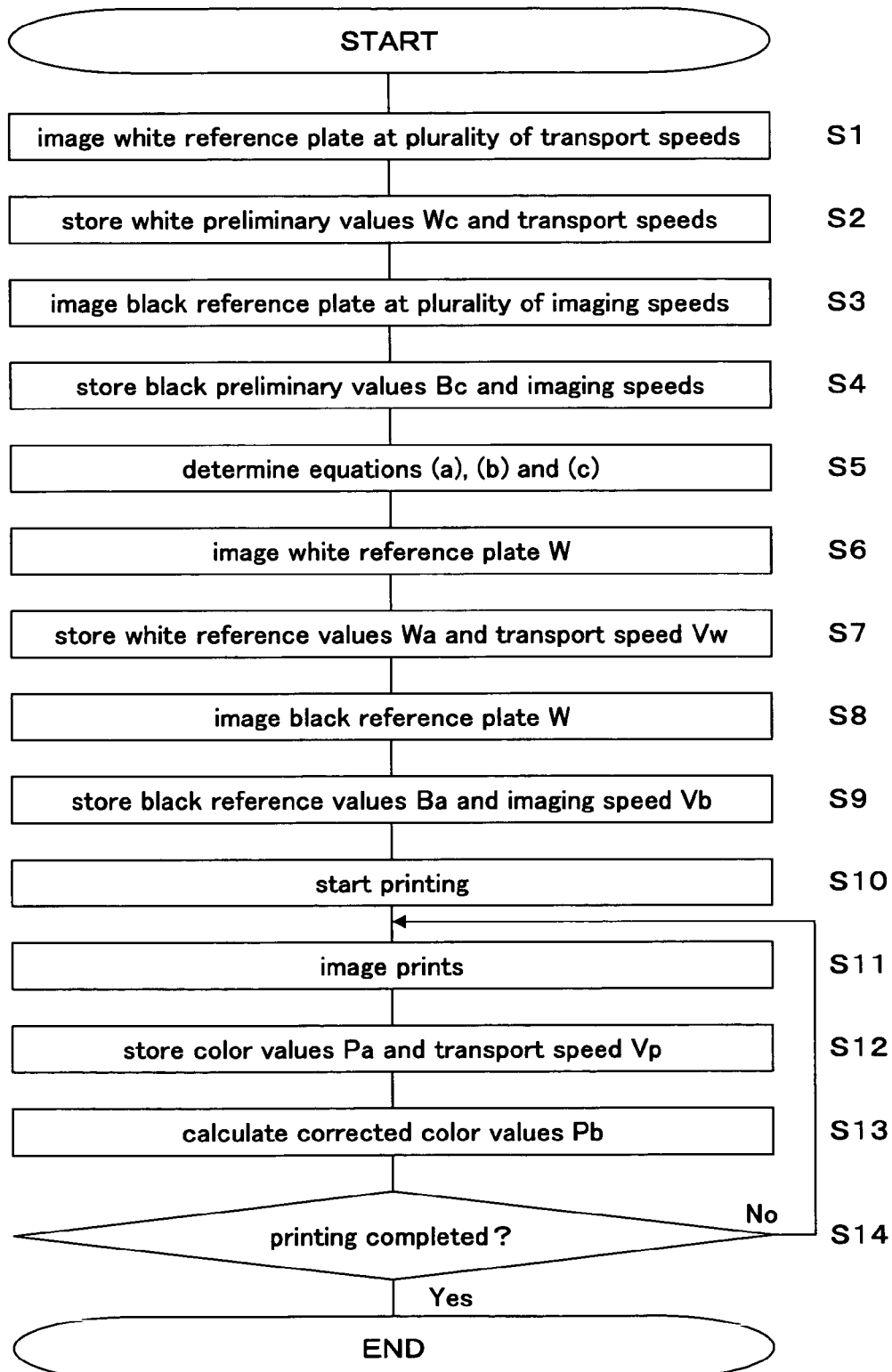
FIG. 4 is a flow chart of a shading correcting method according to this invention.
Figure 5:
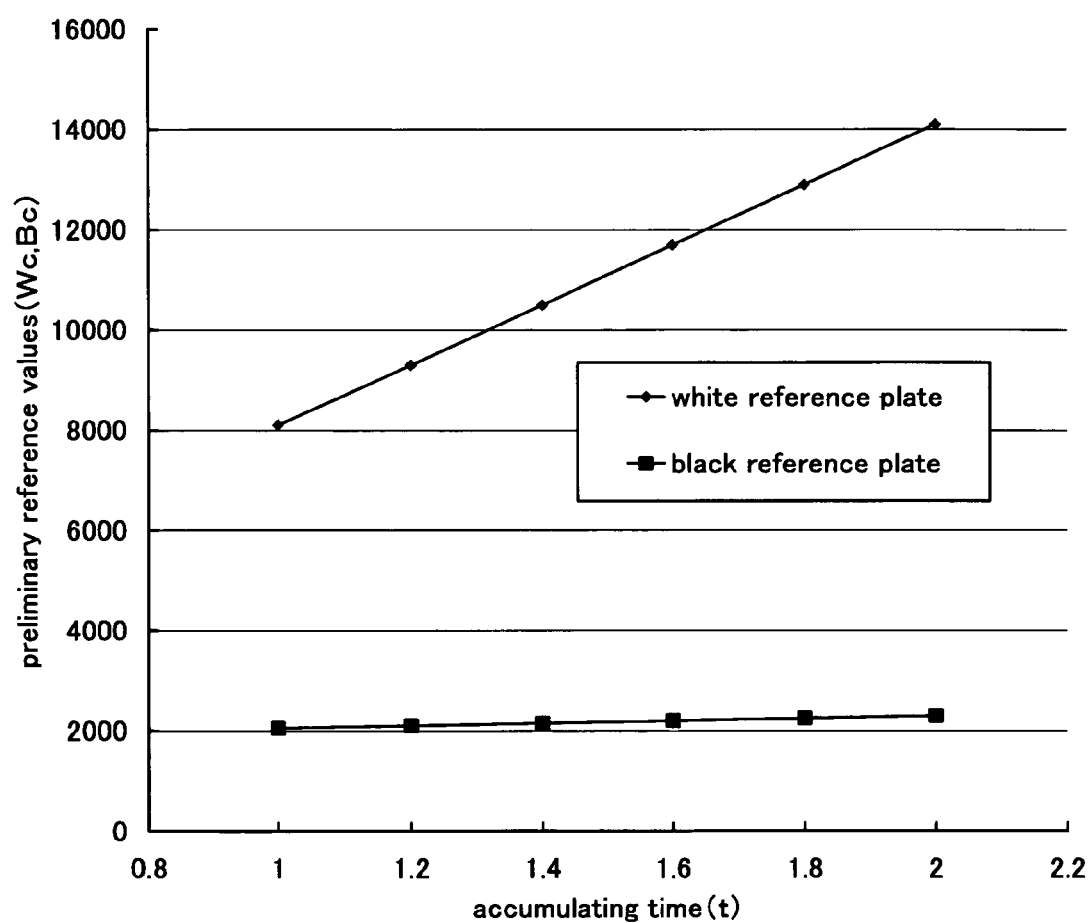
FIG. 5 is a graph showing a relationship between white preliminary reference value Wc and black preliminary reference value Bc, and storage time t.

FIG. 4 is a flow chart of the shading correcting method according to this invention. FIG. 5 is a graph showing white preliminary reference value Wc and black preliminary reference value Bc, and accumulating time t.

When performing a shading correction according to this invention, the printing machine is first set to the reference imaging mode for the image pickup station 60 to image blank paper transported at a plurality of different speeds as preliminary step (step S1). CCD imaging time, i.e. accumulating time t, is determined by transport speed, and therefore the following description is based on the CCD accumulating time t. White preliminary reference values Wc, which are output values of the respective CCDs in the CCD line sensor 66 at this time, and the corresponding accumulating times t are stored in RAM 82 (step S2). Similarly, the shutter 69 is set to the shielding position, and is imaged by the image pickup station 60 for a plurality of different accumulating times t (step S3). The black preliminary reference values Bc, which are output values of the respective CCDs in the CCD line sensor 66 at this time, and the corresponding accumulating times t are stored in RAM 82 (step S4).

In this embodiment, as shown in FIG. 5, the white preliminary reference values Wc and black preliminary reference values Bc are obtained by measuring, as preliminary step, each of the white reference plate and black reference plate at intervals of 0.2 between accumulating time t=1 and accumulating time t=2. Specifically, each white preliminary reference value Wc is an average of electric charges accumulated by detecting light from the white reference plate W in every predetermined interval L in the transport direction of blank paper. Each black preliminary reference value Bc is an average of electric charges accumulated by detecting light from the shutter 65 at every predetermined time. The accumulating time t is a relative time unit, and accumulating time t=2 is twice as long as accumulating time t=1. The preliminary reference values are numerical values 0 to 16000 expressing amounts of light received by the CCDs in digital gradation. The white reference value and black reference value show different variations with the accumulating time as shown in FIG. 5, and should be corrected separately.

Next, the values obtained in steps S1 through S4 are calculated by multiple regression analysis, to determine equations (1), (2) and (3) set out hereunder for correcting the color value of prints (step S5). Equations (1) and (2) express relations between the print transport speed Vp derived from the white preliminary reference value Wc and black preliminary reference value Bc measured as preliminary step, and the white reference value Wb and black reference value Bb corresponding to the print transport speed Vp. Equation (3) shows the white reference value Wb and black reference value Bb corresponding to the actual print transport speed Vp substituted for the white reference value Wa and black reference value Ba used in the conventional shading correcting method. Specifically, constants A through I in equations (1) and (2) are determined. Accumulating time t is obtained by dividing the predetermined interval L of imaging by the CCD line sensor, by transport speed Vw. Since the predetermined interval L is determined by reading resolution, accumulating time t and transport speed Vw are in one-to-one relationship.

$$Wb = \left[\left(A \times \frac{\frac{L}{Vp}}{\frac{L}{Vw}}\right) + B\right] \times Wa + \left[\left(C \times \frac{\frac{L}{Vp}}{\frac{L}{Vw}}\right) + D\right] \quad (1)$$

$$Bb = \left[\left(E \times \frac{\frac{L}{Vp}}{\frac{L}{Vb}}\right) + F\right] \times Ba + \left[\left(G \times \frac{\frac{L}{Vp}}{\frac{L}{Vb}}\right) + H\right] \quad (2)$$

$$Pb = \frac{I}{(Wb - Bb)} \times (Pa - Bb) \quad (3)$$

In this embodiment, since the shutter 69 is set to the shielding position for shielding the front of the condenser lens 65 in time of the black reference imaging in the reference reading mode, L/Vb in equation (2) is regarded as accumulating time t.

After equations (1), (2) and (3) are determined as described above, blank paper is transported and imaged at the image pickup station 60 (step S6). White reference value Wa and corresponding transport speed Vw are stored in RAM 82 (step S7). The shutter 69 is set to the shielding position, and is imaged at every time needed to image the blank paper in one sampling interval L (step S8). Black reference value Ba and corresponding imaging speed Vb are stored in RAM 82 (step S9). The black reference value Ba may be obtained by transporting black paper and imaging it at the image pickup station 60, as in the case of blank paper, instead of setting the shutter 69 to the shielding position. In this case, the predetermined interval L for the CCD line sensor to image the black paper and the transport speed Vb of the black paper are substituted for L/Vb in equation (2).

Subsequently, a printing operation is started as described hereinbefore (step S10). For example, this printing operation is performed at low speed until printing stabilizes, and at high speed after printing attains stability. As a result, prints are transported at low speed until printing stabilizes, and at high speed after printing attains stability.

The prints are imaged at the image pickup station 60 (step S11). The CCDs obtain color values Pa from the prints. The color values Pa obtained and a corresponding transport speed Vp are stored in RAM 82 (step S12).

The white reference value Wa, transport speed Vw, black reference value Ba, imaging speed Vb, color values Pa, and transport speed Vp in time of actual printing, stored in RAM 82 are substituted into equations (1), (2) and (3) to calculate corrected color values Pb (step S13). This calculation provides accurately corrected color values Pb.

Proper printing is carried out by comparing image data obtained from the color values Pb corrected as described above, and the reference image data set beforehand.

When the printing is completed (step S14), the shading correcting process will also be ended.

In the embodiment described above, the corrected black reference value Bb corresponding to the print transport speed Vp is derived from the black reference value Ba obtained by actually measuring the black reference plate B. However, as seen from FIG. 5, the black reference value Ba, compared with the white reference value Wa, is hardly influenced by the variations in accumulating time t. Thus, although accuracy lowers somewhat, the calculation may be carried out by substituting the black reference value Ba, instead of the corrected black reference value Bb, into equation (3) above. That is, in this case, the black reference value is not adjusted according to the transport speed.

This invention may be embodied in other specific forms without departing from the spirit or essential attributes thereof and, accordingly, reference should be made to the appended claims, rather than to the foregoing specification, as indicating the scope of the invention.

This application claims priority benefit under 35 U.S.C. Section 119 of Japanese Patent Application No. 2004-188240 filed in the Japanese Patent Office on Jun. 25, 2004, the entire disclosure of which is incorporated herein by reference.

What is claimed is:

1. An apparatus for measuring color values of prints, having imaging means with a plurality of imaging elements arranged transversely of a print transport direction for imaging, at predetermined intervals, the prints transported by transport means, the apparatus performing a shading correction of image data from said plurality of imaging elements by using a white preliminary reference value and a black preliminary reference value obtained by imaging a white reference plate and a black reference plate with said imaging means, said apparatus comprising:

control means for variably controlling a print transport speed of said transport means;

storage means for storing a relationship between said print transport speed and said white preliminary reference value and said black preliminary reference value corresponding to said print transport speed; and correcting means for correcting color values obtained by imaging the prints with said imaging means, by using a white reference value and a black reference value corresponding to an actual print transport speed obtained from a print transport speed in time of actual printing and the relationship, stored in said storage means, between said print transport speed and said white preliminary reference value and said black preliminary reference value corresponding to said print transport speed, wherein the following equations are established:

$$Wb = \left[\left(A \times \frac{\frac{L}{Vp}}{\frac{L}{Vw}}\right) + B\right] \times Wa + \left[\left(C \times \frac{\frac{L}{Vp}}{\frac{L}{Vw}}\right) + D\right] \quad (1)$$

$$Bb = \left[\left(E \times \frac{\frac{L}{Vp}}{\frac{L}{Vb}}\right) + F\right] \times Ba + \left[\left(G \times \frac{\frac{L}{Vp}}{\frac{L}{Vb}}\right) + H\right] \quad (2)$$

$$Pb = \frac{I}{(Wb - Bb)} \times (Pa - Bb) \quad (3)$$

where L is said predetermined intervals, Vw is a transport speed of said white reference plate, Vb is a transport speed of said black reference plate, Vp is said print transport speed, Wa is said white reference value, Ba is said black reference value, Pa is said color values, Wb is a corrected white reference value corresponding to said print transport speed, Bb is a black reference value converted into a value corresponding to said print transport speed, Pb is corrected color values, and A through I are constants.

2. An apparatus as defined in claim 1, wherein said imaging means includes CCDs arranged in one direction.

3. An apparatus as defined in claim 1, wherein said black reference plate is a shield member for shielding said imaging means.

4. An apparatus as defined in claim 1, wherein said white reference plate is blank paper transported by said transport means.

5. An apparatus as defined in claim 1, wherein the relationship, stored in said storage means, between said print transport speeds and said white preliminary reference value and said black preliminary reference value corresponding to said print transport speed is determined by using preliminary reference values obtained by imaging the white reference plate and the black reference plate transported at a plurality of different speeds as a preliminary step.

6. An apparatus as defined in claim 5, wherein said white preliminary reference value and said black preliminary reference value are a white reference value obtained by imaging a white reference plate, and a black reference value obtained by imaging a black reference plate, respectively.

7. An apparatus as defined in claim 5, wherein the relationship, stored in said storage means, between said print transport speed and said white preliminary reference value and said black preliminary reference value corresponding to said print transport speed is determined by using a ratio between a reference plate transport speed and said print transport speed.

8. In an apparatus for measuring color values of prints, having imaging means with a plurality of imaging elements arranged transversely of a print transport direction for imaging the prints transported by transport means, a shading correcting method for performing a shading correction of image data from said plurality of imaging elements by using a white preliminary reference value and a black preliminary reference value obtained by imaging a white reference plate and a black reference plate with said imaging means, said method comprising:

a reference plate imaging step for imaging the reference plates with said imaging means;

a storing step for storing a relationship between said print transport speed and said white preliminary reference value and said black preliminary reference value corresponding to said print transport speed;

a print imaging step for imaging, with said imaging means, said prints transported by said transport means; and a correcting step for correcting color values obtained by imaging the prints with said imaging means, by using a white reference value and a black reference value corresponding to an actual print transport speed obtained from a print transport speed in time of an actual printing operation and the relationship, stored in said storing step, between said print transport speed and said white preliminary reference value and said black preliminary reference value corresponding to said print transport speed, wherein the following equations are established:

$$Wb = \left[\left(A \times \frac{\frac{L}{Vp}}{\frac{L}{Vw}}\right) + B\right] \times Wa + \left[\left(C \times \frac{\frac{L}{Vp}}{\frac{L}{Vw}}\right) + D\right] \quad (1)$$

$$Bb = \left[\left(E \times \frac{\frac{L}{Vp}}{\frac{L}{Vb}}\right) + F\right] \times Ba + \left[\left(G \times \frac{\frac{L}{Vp}}{\frac{L}{Vb}}\right) + H\right] \quad (2)$$

$$Pb = \frac{I}{(Wb - Bb)} \times (Pa - Bb) \quad (3)$$

where L is said predetermined intervals, Vw is a transport speed of said white reference plate, Vb is a transport speed of said black reference plate, Vp is said print transport speed, Wa is said white reference value, Ba is said black reference value, Pa is said color values, Wb is a corrected white reference value corresponding to said print transport speed, Bb is a black reference value converted into a value corresponding to said print transport speed, Pb is corrected color values, and A through I are constants.

9. A method as defined in claim 8, wherein said imaging means includes CCDs arranged in one direction.

10. A method as defined in claim 8, wherein said black reference plate is a shield member for shielding said imaging means.

11. A method as defined in claim 8, wherein said white reference plate is blank paper transported by said transport means.

12. A method as defined in claim 8, wherein the relationship between said print transport speed and said white preliminary reference value and said black preliminary reference value corresponding to said print transport speed stored in said storing step is determined by using preliminary reference values obtained by imaging the white reference plate and the black reference plate transported at a plurality of different speeds as a preliminary step.

13. A method as defined in claim 12, wherein said white preliminary reference value and said black preliminary reference value are a white reference value obtained by imaging a white reference plate, and a black reference value obtained by imaging a black reference plate, respectively.

14. A method as defined in claim 12, wherein the relationship, stored in said storing step, between said print transport speed and said white preliminary reference value and said black preliminary reference value corresponding to said print transport speed is determined by using a ratio between a reference plate transport speed and said print transport speed.

* * * * *